United States Patent
Lovegrove

(10) Patent No.: US 11,481,351 B2
(45) Date of Patent: Oct. 25, 2022

(54) PIN CONNECTION PROTOCOL UPDATING

(71) Applicant: Morphix, Inc., Vancouver, WA (US)

(72) Inventor: Jonathan Lovegrove, Yacolt, WA (US)

(73) Assignee: MORPHIX, INC., Vancouver, WA (US)

( * ) Notice: Subject to any disclaimer, the term of this patent is extended or adjusted under 35 U.S.C. 154(b) by 0 days.

(21) Appl. No.: 17/077,993

(22) Filed: Oct. 22, 2020

(65) Prior Publication Data
US 2022/0129404 A1 Apr. 28, 2022

(51) Int. Cl.
*G06F 13/42* (2006.01)
*G06F 13/40* (2006.01)

(52) U.S. Cl.
CPC ...... *G06F 13/4265* (2013.01); *G06F 13/4068* (2013.01)

(58) Field of Classification Search
CPC .......... G06F 13/4265; G06F 13/4068
See application file for complete search history.

(56) References Cited

U.S. PATENT DOCUMENTS

| | | | | |
|---|---|---|---|---|
| 5,734,872 A * | 3/1998 | Kelly | .......... | G06F 13/4068 703/20 |
| 7,133,958 B1 * | 11/2006 | Kuskin | .......... | G06F 13/385 710/313 |
| 2003/0097502 A1 * | 5/2003 | Bacigalupo | ....... | G06F 13/385 710/100 |
| 2009/0178017 A1 * | 7/2009 | Gupta | .......... | G06F 30/327 716/137 |
| 2010/0264955 A1 * | 10/2010 | Wang | .......... | H01L 23/525 326/101 |
| 2011/0126005 A1 * | 5/2011 | Carpenter | .......... | G06F 13/385 713/158 |
| 2014/0095756 A1 * | 4/2014 | Tsai | .......... | G06F 13/4068 710/305 |
| 2017/0109302 A1 * | 4/2017 | Wang | .......... | G06F 13/4282 |
| 2020/0195759 A1 * | 6/2020 | Brouse | .......... | G06F 13/4282 |

OTHER PUBLICATIONS

Tony R. Kuphaldt, "Lessons In Electric Circuits", Nov. 1, 2007, vol. IV, Fourth Edition, pp. 29-102 (Year: 2007).*

* cited by examiner

*Primary Examiner* — Phong H Dang
(74) *Attorney, Agent, or Firm* — Alleman Hall Creasman & Tuttle LLP

(57) ABSTRACT

A computing device is provided, including a processor having a plurality of pins that are electrically coupled to a connector via respective traces. The computing device may further include a memory device storing a state table that maps the plurality of pins to a respective plurality of connection protocols. The processor may be configured to implement control logic for the plurality of pins at least in part by receiving a selection of a pin of the plurality of pins. Implementing the control logic may further include receiving an updated connection protocol for the selected pin. Implementing the control logic may further include updating the state table such that the selected pin is mapped to the updated connection protocol. Implementing the control logic may further include, via the connector, establishing a connection to an external device using the updated connection protocol implemented at the selected pin.

11 Claims, 6 Drawing Sheets

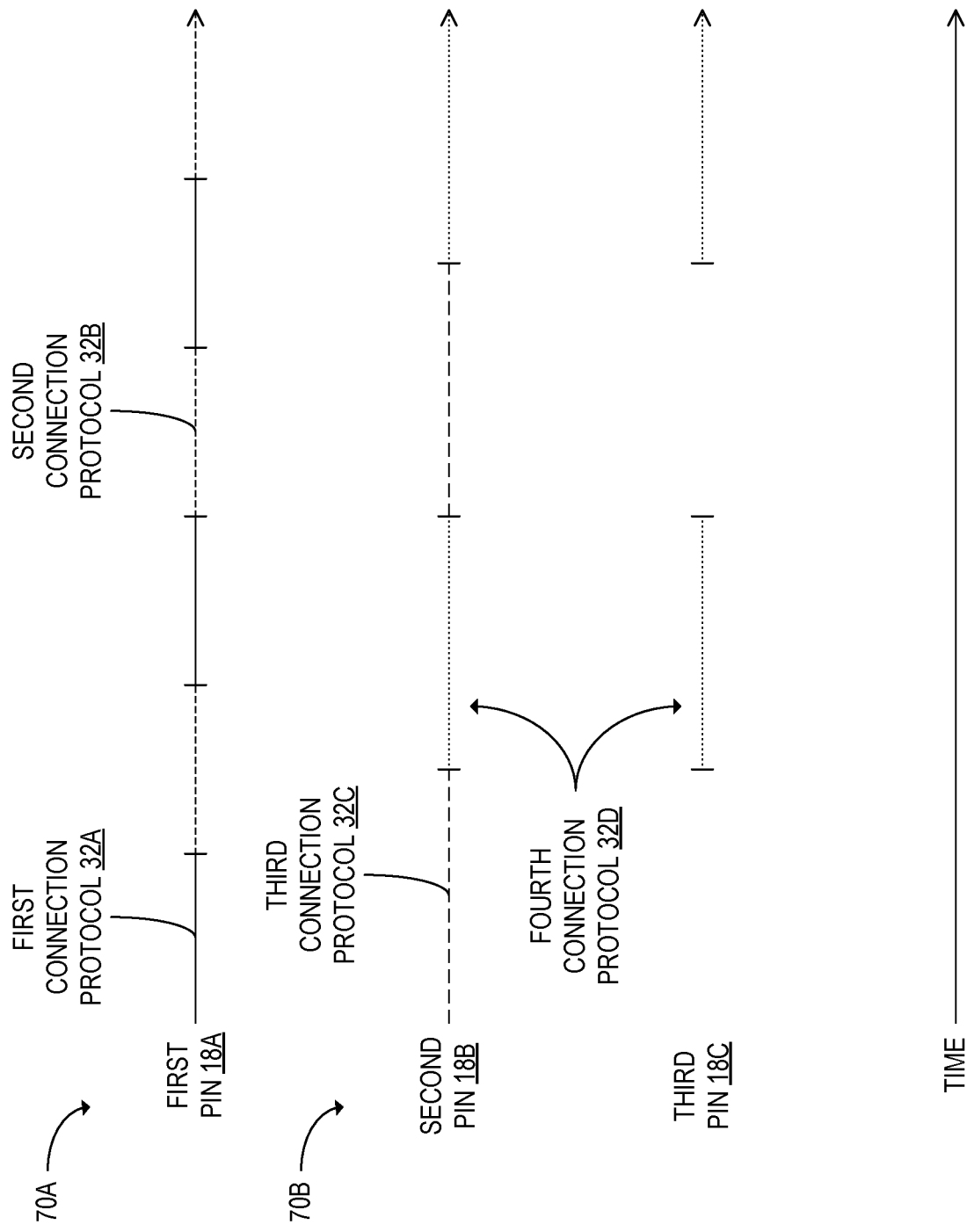

PIN CONNECTION PROTOCOL UPDATING

BACKGROUND

Internet of Things (IoT) connected devices have recently come to be used in a wide variety of settings, such as manufacturing, transportation, resource extraction, climate control for buildings, and biometrics. For example, IoT connected devices may include sensors with which the IoT connected devices collect data related to the physical environments in which they are located. In addition, IoT connected devices may include controllable devices that are configured to perform physical actions in response to receiving control signals. The IoT connected device may be configured to communicate with a device controller to which the IoT connected device may transmit sensor data. The IoT connected device may also receive control signals from the device controller. The device controller may communicate with one or more computing devices, such as an edge computing device at which a user may monitor data received from the sensors or specify properties of the control signals that are sent to the IoT connected device.

SUMMARY

According to one aspect of the present disclosure, a computing device is provided, including a processor having a plurality of pins that are electrically coupled to a connector via respective traces. The computing device may further include a memory device storing a state table that maps the plurality of pins to a respective plurality of connection protocols. The processor may be configured to implement control logic for the plurality of pins at least in part by receiving a selection of a pin of the plurality of pins. Implementing the control logic may further include receiving an updated connection protocol for the selected pin. Implementing the control logic may further include updating the state table such that the selected pin is mapped to the updated connection protocol. Implementing the control logic may further include, via the connector, establishing a connection to an external device using the updated connection protocol implemented at the selected pin.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 4 shows examples of a first predefined temporal multiplexing schedule and a second predefined temporal multiplexing schedule, according to the example of FIG. 1.

DETAILED DESCRIPTION

When a device controller communicates with an IoT connected device, the device controller structures those communications according to a communication protocol. The communication protocol may specify the corresponding formats of incoming and outgoing data that are received at the device controller from the IoT connected device and transmitted from the device controller to the IoT connected device, respectively. In addition, the communication protocol may specify a timing pattern with which data is transmitted between the IoT connected device and the device controller. Example communication protocols include analog input/output, pulse width modulated (PWM) input/output, Ethernet, and universal serial bus (USB).

The device controllers for existing IoT connected devices typically have fixed sets of communication protocols via which they may communicate with the IoT connected devices. As a result, such device controllers may be incompatible with many IoT connected devices. Thus, in order to communicate with multiple IoT connected devices that use different types of inputs and outputs, the user may have to attach one or more adapters to the device controller or install multiple device controllers. In addition, the user may have to switch to using a different device controller when a new IoT connected device that uses an unsupported communication protocol is installed. Thus, lack of communication protocol flexibility may increase costs associated with using IoT connected devices.

Figure 1:
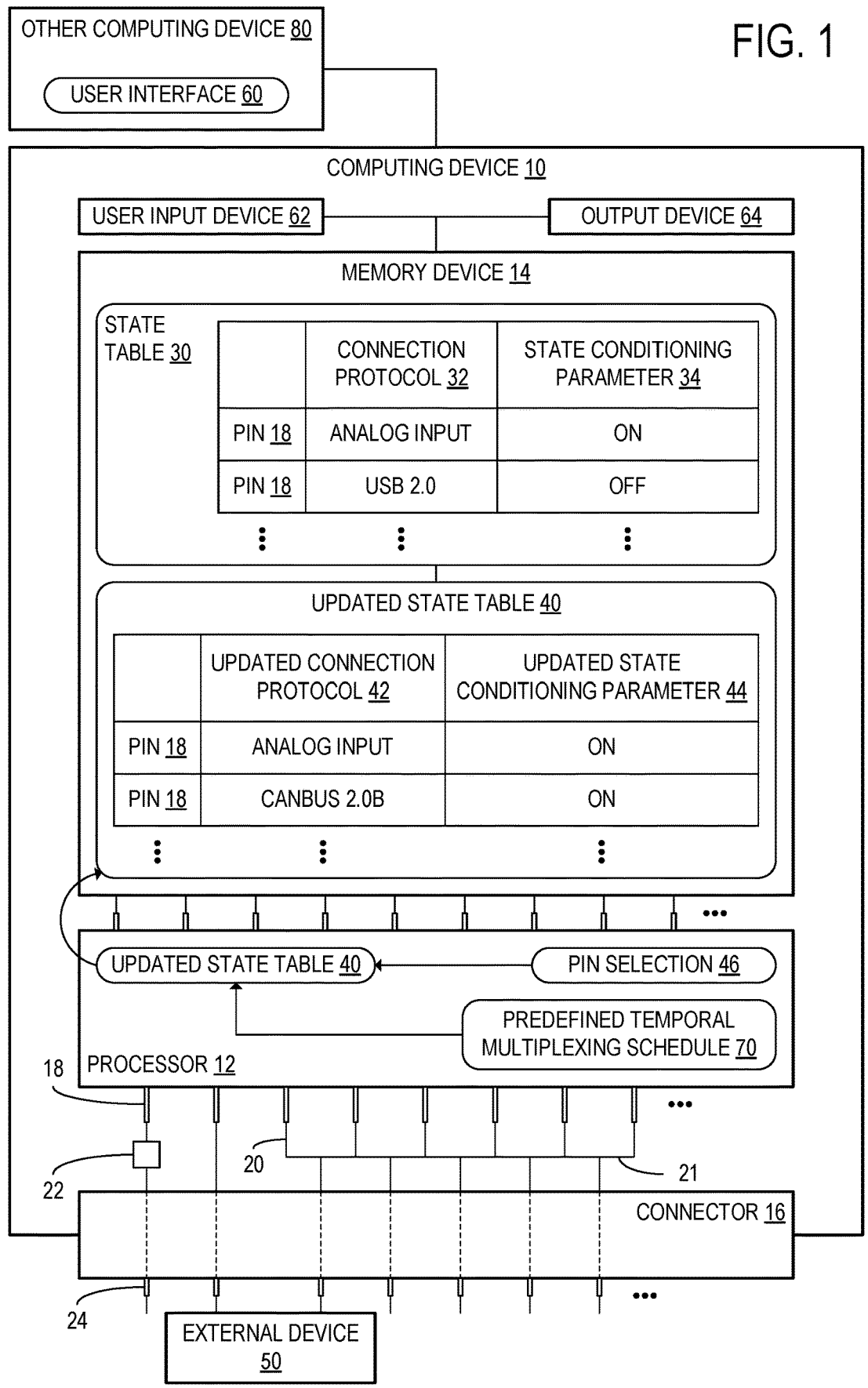
FIG. 1 schematically shows a computing device coupled to an external device, according to one example embodiment.

In order to address the shortcomings discussed above, a computing device 10 is provided, as shown in FIG. 1 according to one example embodiment. The computing device 10 shown in FIG. 1 may be used as a device controller. FIG. 1 further shows an external device 50, which may be an IoT connected device. The external device 50 may be coupled to the computing device 10 by a wired connection via a connector 16 included in the computing device 10.

The computing device 10 may include a processor 12 and a memory device 14. The processor 12 may have a plurality of pins 18 that are electrically coupled to the connector 16 via respective electrical traces 20. In addition, one or more pins 18 of the plurality of pins 18 may be electrically coupled to the memory device 14. In some examples, the processor 12 may be instantiated as a plurality of processor cores. Similarly, the memory device 14 may be instantiated as a plurality of physical memory devices in some examples. The memory device 14 may include volatile memory and non-volatile memory.

In some examples, for one or more pins 18 of the plurality of pins 18, the computing device 10 may further include an intermediate circuit element 22 located between the pin 18 and the connector 16 along the electrical trace 20 of the pin 18. For example, the intermediate circuit element 22 may be a resistor, a transformer, an optical isolator, or an amplifier. In some examples, one or more of the traces 20 may have a plurality of intermediate circuit elements 22. As discussed in further detail below, the one or more intermediate circuit elements 22 may be addressable such that they may be switched on and off.

The connector 16 may include a plurality of connector pins 24 which may be electrically coupled to the pins 18 of the processor 12 by the electrical traces 20. In some examples, at least one connector pin 24 of the plurality of connector pins 24 may be electrically coupled to two or more multiplexed pins 18 of the plurality of pins 18 of the processor 12. In the example of FIG. 1, a connector pin 24 via which the computing device 10 is coupled to the external device 50 is electrically coupled to the respective electrical traces 20 of two pins 18 of the processor 12. Each pin 18 may have a one-to-one connection with a corresponding connector pin 24 or may be coupled to two or more connector pins 24. As shown in the example of FIG. 1, a plurality of pins 18 may be coupled to a bus 21 that is coupled to a plurality of connector pins 24. Alternatively, in some examples, each connector pin 24 may be coupled to a different combination of pins 18.

The connection between the connector 16 and the external device 50 may utilize one or more connector pins 24. When the connector 16 is connected to the external device 50 by a plurality of the connector pins 24, one or more of the connector pins 24 may be input pins configured to receive input signals from the external device 50, and one or more of the connector pins 24 may be output pins configured to convey output signals to the external device 50. In addition, one or more of the connector pins 24 may be ground pins configured to ground the external device 50 or a bias voltage pin configured to provide a bias voltage to the external device 50. For example, when the external device 50 is connected to the connector 16 via the USB 2.0B protocol, the external device 50 is connected to the connector 16 over four connector pins 24 including an input pin, an output pin, a ground pin, and a bias voltage pin.

The memory device 14 may be configured to store a state table 30 that maps the plurality of pins 18 to a respective plurality of connection protocols 32. In some examples, the mapping between pins 18 and connection protocols 32 may be one-to-one such that each connection protocol 32 is assigned to a single pin 18. Alternatively, one or more of the connection protocols 32 may use a plurality of pins 18 of the processor 12.

In addition, in some examples, two or more connection protocols 32 of the plurality of connection protocols 32 may be implemented concurrently over the connector 16. When two or more connection protocols 32 are implemented concurrently over the connector 16, the two or more connection protocols 32 may be used in communications between the computing device 10 and two or more respective external devices 50.

In examples in which the computing device 10 includes one or more intermediate circuit elements 22 located along one or more of the electrical traces 20, the state table 30 may further include a respective plurality of state conditioning parameters 34 for the plurality of pins 18. Each state conditioning parameter 34 may indicate, for a pin 18 of the plurality of pins 18, whether the intermediate circuit element 22 located between the pin 18 and the connector 16 along the electrical trace 20 of the pin 18 is activated or deactivated. The state table 30 may further include one or more respective indications that one or more pins 18 do not have corresponding intermediate circuit elements 22 that may be activated or deactivated. In some examples, the state conditioning parameter 34 for an intermediate circuit element 22 may have values other than "activated" or "deactivated." For example, the intermediate circuit element 22 may be a variable resistor, and the state conditioning parameter 34 may indicate a resistance value of the variable resistor.

The processor 12 may be configured to implement control logic for the plurality of pins 18. Implementing the control logic may include receiving a selection 46 of a pin 18 of the plurality of pins 18. In addition, the processor 12 may be further configured to receive an updated connection protocol 42 for the selected pin 18. The processor 12 may be further configured to receive an updated state conditioning parameter 44 for the selected pin 18.

Figure 2:
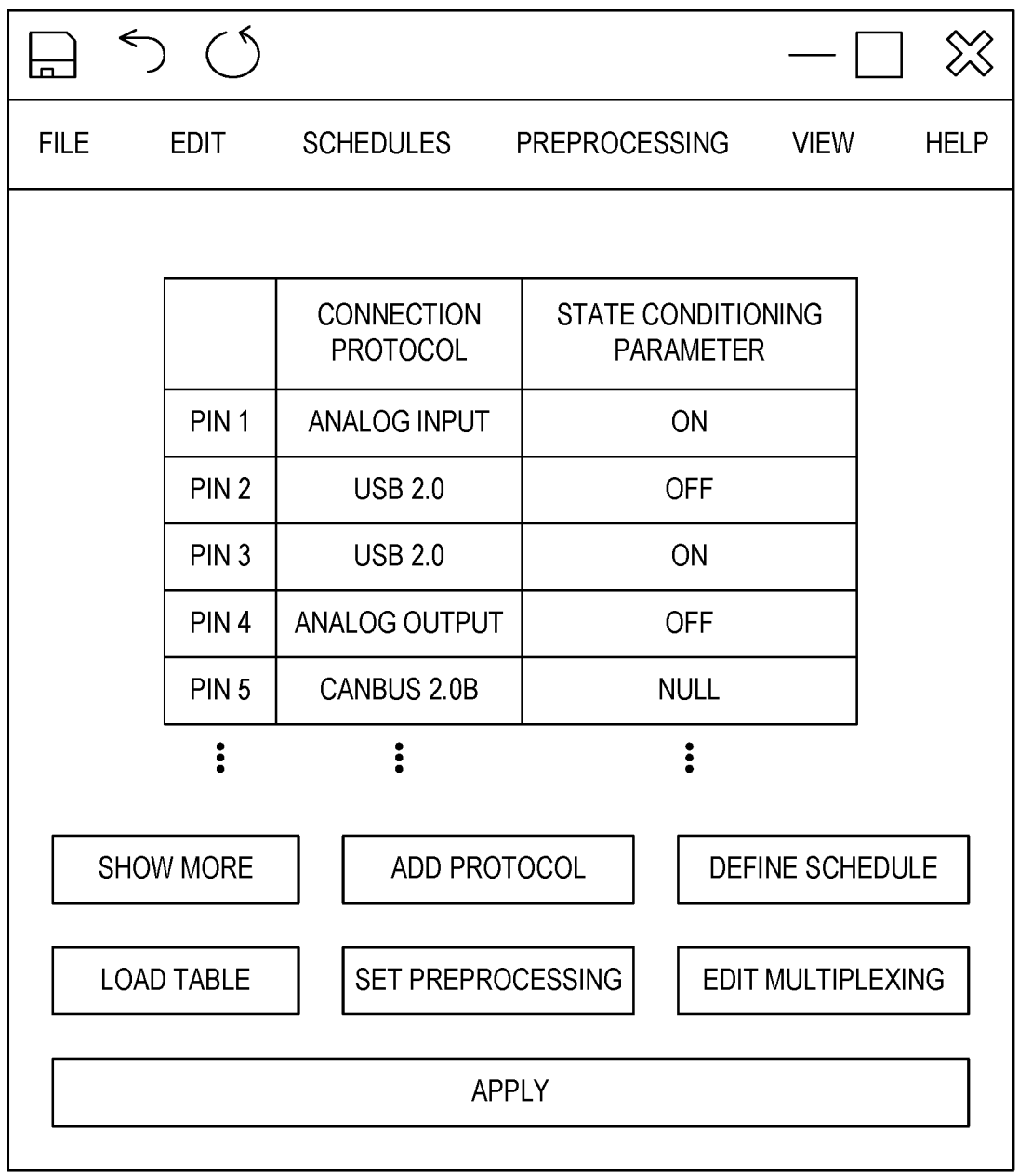
FIG. 2 shows an example state table updating interface via which a user may specify a selected pin and an updated connection protocol, according to the example of FIG. 1.

The pin 18, the updated connection protocol 42, and the updated state conditioning parameter 44 may each be selected at a user interface 60. In some examples, the user interface 60 may be provided via one or more user input devices 62 and one or more output devices 64 included in the computing device 10. Alternatively, the user interface 60 may be provided at another computing device 80 with which the computing device 10 is configured to communicate via a wired or wireless connection. FIG. 2 shows an example user interface 60 provided as a graphical user interface (GUI) at which the user may specify the pin selection 46, the updated connection protocol 42, and the updated state conditioning parameter 44. As shown in the example of FIG. 2, the user interface 60 may include an editable representation of the state table 30.

Returning to FIG. 1, implementing the control logic may further include updating the state table 30 to generate an updated state table 40. In the updated state table 40, the selected pin 18 specified by the pin selection 46 is mapped to the updated connection protocol 42. In examples in which the processor 12 receives an updated state conditioning parameter 44, the selected pin 18 may also have the updated state conditioning parameter 44 in the updated state table 40. In the example updated state table 40 shown in FIG. 1, the connection protocol 32 for a pin 18 is updated from USB 2.0 to CanBus 2.0B and the state conditioning parameter 34 for that pin 18 is updated from off to on.

Updating the state table 30 may, in some examples, include changing whether an input rule or an output rule of the connection protocol 32 is implemented at the selected pin 18. An input rule is a portion of the connection protocol 32 that specifies properties of inputs received at a device, and an output rule is a portion of the connection protocol 32 that specifies properties of outputs transmitted by a device. Thus, in such examples, the processor 12 may be configured to switch between receiving input data and transmitting output data at the selected pin 18.

Implementing the control logic may further include, via the connector 16, establishing a connection to the external device 50 using the updated connection protocol 42 implemented at the selected pin 18. In examples in which the processor 12 is further configured to receive an updated state conditioning parameter 44 for an intermediate circuit element 22, implementing the control logic may further include activating or deactivating the intermediate circuit element 22 in response to receiving the updated state conditioning parameter 44. For example, when the updated connection protocol 42 has a different voltage range or current range from that of the connection protocol 32, one or more intermediate circuit elements 22 may be activated or deactivated to change a voltage range or current range for electrical signals at the pin 18.

Figure 3:
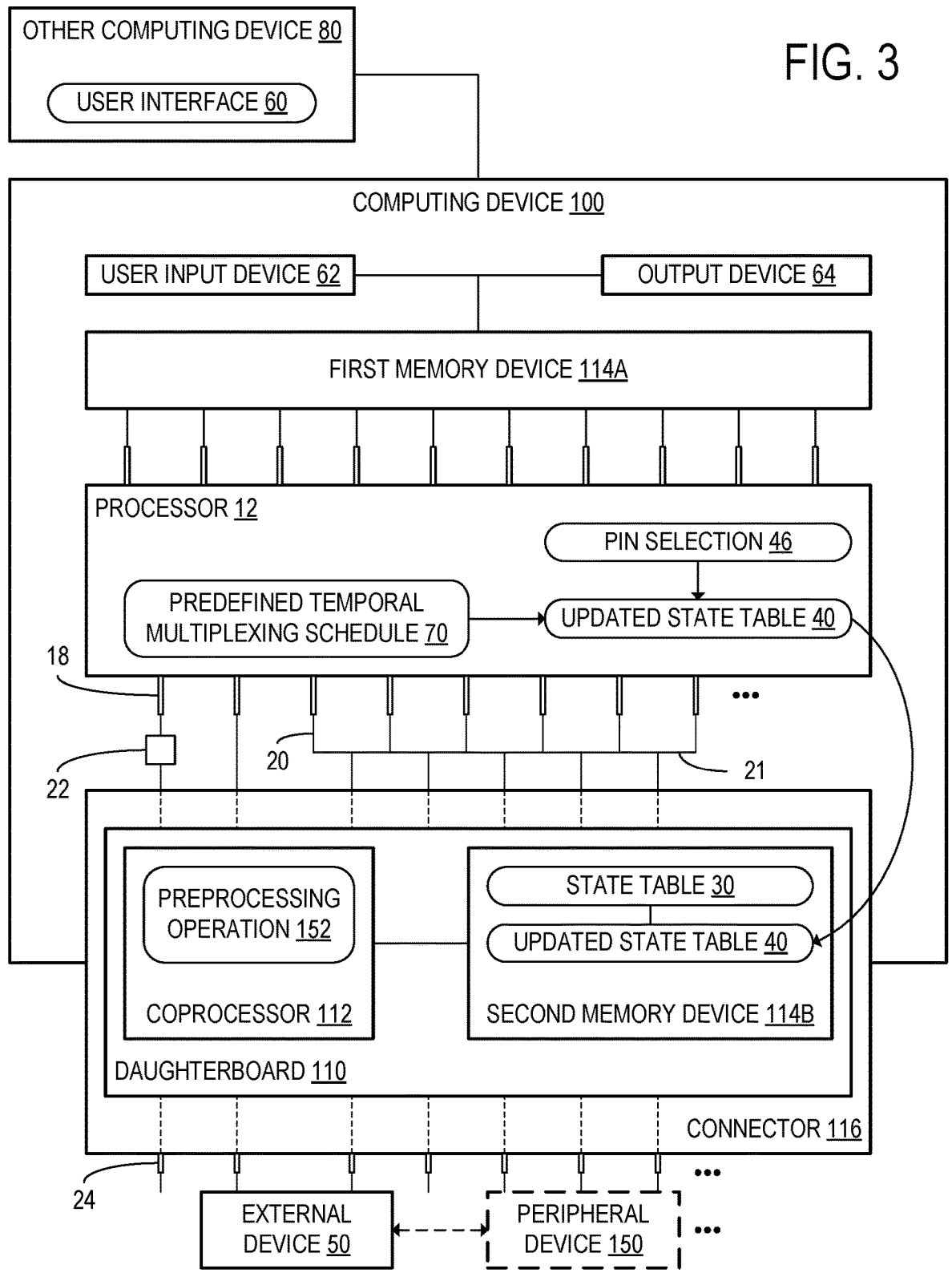
FIG. 3 shows an example computing device in which a connector to an external device includes a daughterboard.

FIG. 3 shows another example computing device 100 including a connector 116 via which the computing device 100 is coupled to both the external device 50 and to one or more peripheral devices 150. For example, the one or more peripheral devices 150 may include one or more optically isolated circuits, one or more additional memory devices, one or more user input devices, one or more output devices, or one or more wireless communication devices. Other types of peripheral devices 150 may alternatively be used to extend the functionality of the computing device 100.

As shown in the example of FIG. 3, the connector 116 may further include a daughterboard 110 via which one or more peripheral devices 150 are communicatively coupled to the processor 12. The daughterboard 110 may include a coprocessor 112. The coprocessor 112 may be configured to perform a preprocessing operation 152 on an input transmitted from a peripheral device 150 of the one or more peripheral devices 150 to the processor 12 or an output transmitted from the processor 12 to a peripheral device 150 of the one or more peripheral devices 150. For example, the preprocessing operation 152 may be an amplification operation or a noise reduction operation.

In the example of FIG. 3, the computing device 100 includes a first memory device 114A. In addition, the computing device 100 includes a second memory device 114B located on the daughterboard 110. The memory device in which the state table 30 is stored may, in some examples, be the second memory device 114B located on the daughterboard 110. In such examples, the processor 12 may be configured to receive the state table 30 from the second memory device 114B upon startup.

Returning to FIG. 1, in some examples, the processor 12 may be further configured to dynamically switch between two or more connection protocols 32 via which a connection is implemented between one or more pins 18 and an external device 50. This connection protocol switching may be performed at the processor 12 between communication sessions for the processor 12 and the external device 50. Alternatively, connection protocol switching may be performed during a communication session.

As shown in FIG. 4, the processor 12 may be configured to update the one or more respective connection protocols 32 of one or more pins 18 of the plurality of pins 18 according to a predefined temporal multiplexing schedule 70. A predefined temporal multiplexing schedule is an indication of a plurality of time intervals with a respective plurality of corresponding connection protocols 32. The predefined temporal multiplexing schedule may, according to one example, be set by the user at the GUI 60. The predefined temporal multiplexing schedule 70 may be used as a security feature. For example, using a predefined temporal multiplexing schedule 70 may interfere with attempts to extract confidential information from, or insert malicious code into, communications between the computing device 10 and the external device 50.

FIG. 4 shows examples of a first predefined temporal multiplexing schedule 70A for a first pin 18A and a second predefined temporal multiplexing schedule 70B for a second pin 18B and a third pin 18C. The first predefined temporal multiplexing schedule 70A includes a first connection protocol 32A that alternates with a second connection protocol 32B at a predefined time interval. The second predefined temporal multiplexing schedule 70B includes a third connection protocol 32C that alternates with a fourth connection protocol 32D at another predefined time interval. The third connection protocol 32C is implemented using the second pin 18B, whereas the fourth connection protocol 32D is implemented using both the second pin 18B and the third pin 18C.

The following table shows example names, functions, and voltage or current ranges for the connector pins 24 of a 60-pin connector, according to one example. In addition, the following table shows an example assignment of pins 18 of the processor 12 to the connector pins 24.

| Num | Ref | Name | Functions | Range | Pin |
|---|---|---|---|---|---|
| 0 | A1 | 3V3 | Supply output | 3.3 V | |
| 1 | A2 | A_INA | Analog input | 0-5 V, 0-24 V | |
| 2 | A3 | A_INB | Analog input | 0-5 V, 0-24 V | |
| 3 | A4 | GND | Ground | | |
| 4 | A5 | GND | Ground | | |
| 5 | A6 | GND | Ground | | |
| 6 | A7 | C4_TX | COM4 UART TX | | |
| 7 | A8 | UIO_3 | Digital input | 0-24 V | |
| | | | Digital output | 0-24 V | |
| | | | Analog voltage input | 0-24 V | |
| | | | Analog voltage output | 0-24 V | |
| | | | Analog current input | 0-30 mA | |
| | | | Analog current output | 0-30 mA | |
| 8 | A9 | UIO_1 | Digital input | 0-24 V | |
| | | | Digital output | 0-24 V | |
| | | | Analog voltage input | 0-24 V | |
| | | | Analog voltage output | 0-24 V | |
| | | | Analog current input | 0-30 mA | |
| | | | Analog current output | 0-30 mA | |
| 9 | A10 | PWM_1 | PWM (open-drain) output | 0-24 V | |
| | | | PWM input | 0-24 V | |
| | | | Analog input | 0-5 V, 0-24 V | |
| 10 | A11 | PWM_4 | PWM (open-drain) output | 0-24 V | |
| | | | PWM input | 0-24 V | |
| 11 | A12 | PWM_5 | PWM (open-drain) output | 0-24 V | |
| | | | PWM input | 0-24 V | |
| 12 | B1 | CAN2H | CanBus 2.0B | | |
| 13 | B2 | CAN2L | CanBus 2.0B | | |
| 14 | B3 | C1_TX | COM1 RS232/RS485 | | |
| 15 | B4 | C1_RX | COM1 RS232/RS485 | | |
| 16 | B5 | C2_TX/ C1_CTS | COM2 RS232 TX | | |
| 17 | B6 | C2_RX/ C1_RTS | COM2 RS232 RX | | |
| 18 | B7 | C6_RX | COM6 RS232 | | |
| 19 | B8 | C4_RX | COM4 UART RX | | |
| 20 | B9 | UIO_2 | Digital input | 0-24 V | |
| | | | Digital output | 0-24 V | |
| | | | Analog voltage input | 0-24 V | |
| | | | Analog voltage output | 0-24 V | |
| | | | Analog current input | 0-30 mA | |
| | | | Analog current output | 0-30 mA | |
| 21 | B10 | PWM_0 | PWM (open-drain) output | 0-24 V | |
| | | | PWM input | 0-24 V | |
| | | | Analog input | 0-5 V, 0-24 V | |
| 22 | B11 | C3_TX | COM3 RS232 | | |
| 23 | B12 | C3_RX | COM3 RS232 | | |
| 24 | C1 | CAN1H | CanBus 2.0B | | |
| 25 | C2 | CAN1L | CanBus 2.0B | | |
| 26 | C3 | RJ45_6 | Ethernet | | |
| 27 | C4 | RJ45_3 | Ethernet | | |
| 28 | C5 | RJ45_2 | Ethernet | | |
| 29 | C6 | RJ45_1 | Ethernet | | |
| 30 | C7 | C6_TX | COM6 RS232 | | |
| 31 | C8 | SCLK2 | SPI2 SCLK | 3.3 V | |
| 32 | C9 | ST_TDO | Programming/ | | |

-continued

| Num | Ref | Name | Functions | Range | Pin |
|---|---|---|---|---|---|
| 33 | C10 | UIO_0 | debug Digital input | 0-24 V | |
| | | | Digital output | 0-24 V | |
| | | | Analog voltage input | 0-24 V | |
| | | | Analog voltage output | 0-24 V | |
| | | | Analog current input | 0-30 mA | |
| | | | Analog current output | 0-30 mA | |
| 34 | C11 | PWM_3 | PWM (open-drain) output | 0-24 V | |
| | | | PWM input | 0-24 V | |
| 35 | C12 | I2S_SD | I2S serial data | | |
| 36 | D1 | I2C1_C | I2C1 SCL | 3.3 V | |
| 37 | D2 | I2C1_D | I2C1 SDA | 3.3 V | |
| 38 | D3 | MOSI1 | SPI1 MOSI | 3.3 V | |
| 39 | D4 | I2S_SCK | I2S clock | | |
| 40 | D5 | I2S_WS | I2S word select | | |
| 41 | D6 | SP2_SS | SPI2 chip select | 3.3 V | |
| 42 | D7 | ST_TCK | Programming/debug | | |
| 43 | D8 | MISO2 | SPI2 MISO | 3.3 V | |
| 44 | D9 | USB_P | USB 2.0 | | |
| 45 | D10 | USB_N | USB 2.0 | | |
| 46 | D11 | PWM_2 | PWM (open-drain) output | 0-24 V | |
| | | | PWM input | 0-24 V | |
| | | | Analog input | 0-5 V, 0-24 V | |
| 47 | D12 | UIO_4 | Digital input | 0-24 V | |
| | | | Digital output | 0-24 V | |
| | | | Analog voltage input | 0-24 V | |
| | | | Analog voltage output | 0-24 V | |
| | | | Analog current input | 0-30 mA | |
| | | | Analog current output | 0-30 mA | |
| 48 | E1 | RST_N | Programming/debug | | |
| 49 | E2 | I2C2_C | I2C2 SCL | 3.3 V | |
| 50 | E3 | MISO1 | SPI1 MISO | 3.3 V | |
| 51 | E4 | SCLK1 | SPI1 SCLK | 3.3 V | |
| 52 | E5 | I2C2_D | I2C2 SDA | 3.3 V | |
| 53 | E6 | MOSI2 | SPI2 MOST | 3.3 V | |
| 54 | E7 | DC_IN | Supply input | 7-50 V | |
| 55 | E8 | ST_TMS | Programming/debug | | |
| 56 | E9 | SP1_SS | SPI1 chip select | 3.3 V | |
| 57 | E10 | 24VB | Supply output | 0-24 V | |
| 58 | E11 | 5VO | Supply output | 5 V | |
| 59 | E12 | 24VA | Supply output | 0-24 V | |

Figure 5A:
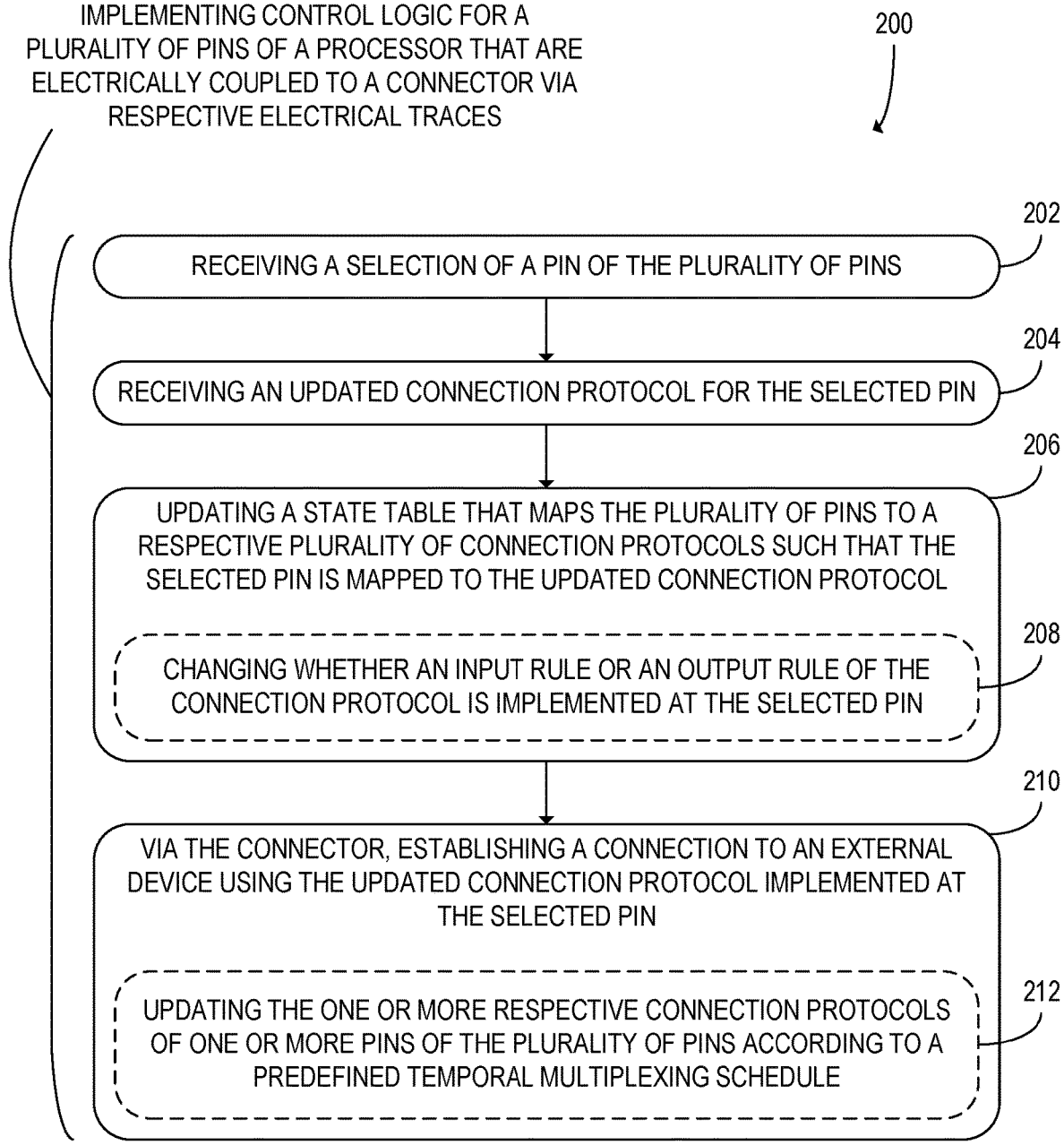
FIG. 5A shows a flowchart of an example method for use with a computing device to implement control logic for a plurality of pins of a processor, according to the example of FIG. 1.

FIG. 5 shows a flowchart of an example method 200 for use with a computing system, such as the computing device 10 of FIG. 1 or the computing device 100 of FIG. 3. The method 200 of FIG. 5 may be a method of implementing control logic for a plurality of pins of a processor that are electrically coupled to a connector via respective electrical traces. In some examples, the connector used in the method 200 may include a plurality of connector pins with which the connector may be coupled to an external device. In such examples, at least one connector pin of the plurality of connector pins may be electrically coupled to two or more multiplexed pins of the plurality of pins of the processor. Alternatively, each connector pin may be electrically coupled to a single pin of the processor.

At step 202, the method 200 may include receiving a selection of a pin of the plurality of pins. For example, the selection of the pin may be received from an input device at which user input may be received via a user interface. The method 200 may further include, at step 204, receiving an updated connection protocol for the selected pin. In some examples, the updated connection protocol may replace an existing connection protocol implemented at the selected pin. The updated connection protocol may also be received from the user input device via the user interface. For example, the user interface may be a state table updating interface provided using the input device and one or more output devices coupled to the computing device.

At step 206, the method 200 may further include updating a state table that maps the plurality of pins to a respective plurality of connection protocols such that the selected pin is mapped to the updated connection protocol. The state table may be stored in the memory of the computing device. In some examples, as shown at step 208, updating the state table may include changing whether an input rule or an output rule of the connection protocol is implemented at the selected pin. Thus, when step 208 is performed, updating the state table may include changing whether the processor is configured to receive an input from the external computing device or transmit an output to the external computing device.

At step 210, the method 200 may further include, via the connector, establishing a connection to the external device using the updated connection protocol implemented at the selected pin. In examples in which the processor has a preexisting active connection to the external device via an existing connection protocol, performing step 210 may include switching the connection from the existing connection protocol to the updated connection protocol. In some examples, as shown at step 212, step 210 may further include updating the one or more respective connection protocols of one or more pins of the plurality of pins according to a predefined temporal multiplexing schedule. Updating a connection protocol according to the predefined temporal multiplexing schedule may include changing the one or more pins with which the connection is implemented.

Figure 5B:
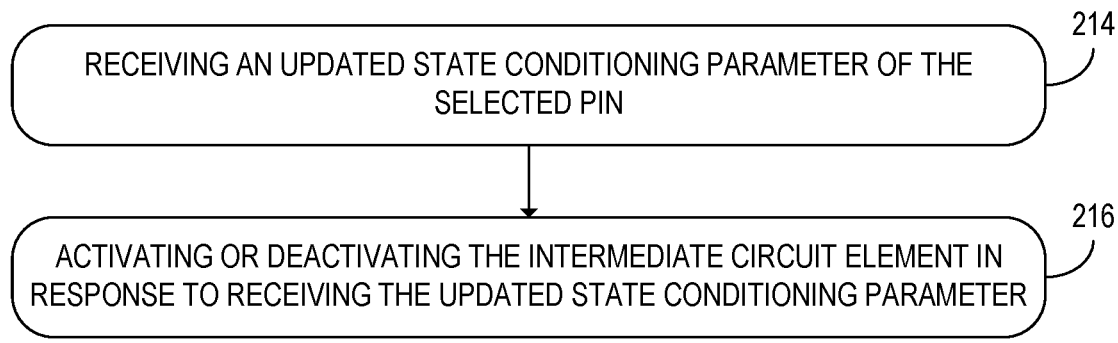
FIG. 5B shows additional steps of the method of FIG. 5A that may be performed in some examples.

FIG. 5B shows additional steps of the method 200 that may be performed in some examples. In such examples, the computing device may further include one or more intermediate circuit elements located between the connector and respective pins along the electrical traces of those pins. For example, each intermediate circuit element may be a resistor, a transformer, an optical isolator, or an amplifier. The one or more intermediate circuit elements may be addressable such that they may be activated or deactivated in response to receiving signals from the processor. In such examples, the method 200 may further include, at step 214, receiving an updated state conditioning parameter of the selected pin. The state conditioning parameter may be a value in the state table that indicates whether an intermediate circuit element is activated or deactivated. In some examples, the state conditioning parameter for an intermediate circuit element may have a value other than "activated" or "deactivated," such as a resistance value of a variable resistor.

Subsequently to receiving the updated state conditioning parameter, the state conditioning parameter indicated for the selected pin may be updated in the state table. The method may further include, at step 216, activating or deactivating the intermediate circuit element in response to receiving the updated state conditioning parameter. In examples in which the intermediate circuit element has an updated state conditioning parameter with a value other than "activated" or "deactivated," a variable property of the intermediate circuit element may be set to that value.

Using the devices and methods discussed above, the connection protocols implemented between the pins of a processor and an external computing device may be flexibly updated without requiring specialized adapters or additional computing devices. Thus, measurement and control operations performed at IoT connected devices may be implemented with less-complex and lower-cost hardware configurations. In addition, when the user adds, removes, or replaces an IoT connected device, such a change to the hardware configuration may be handled more easily at the computing device.

In some embodiments, the methods and processes described herein may be tied to a computing system of one or more computing devices. In particular, such methods and processes may be implemented as a computer-application program or service, an application-programming interface (API), a library, and/or other computer-program product.

Figure 6:
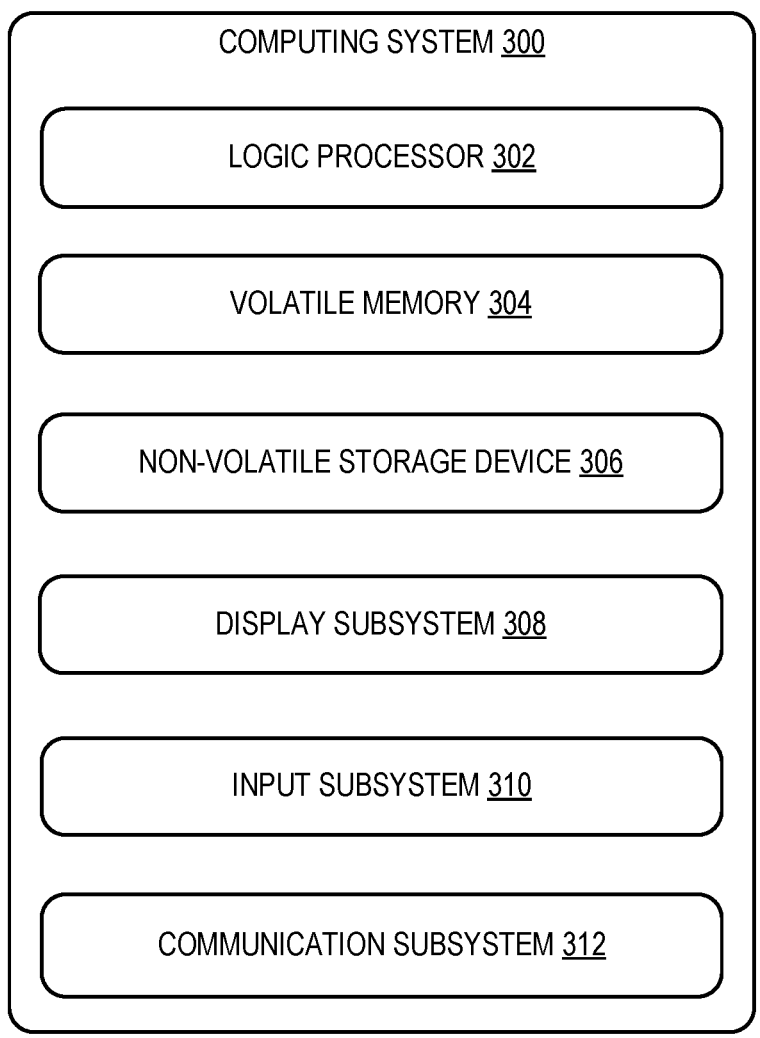
FIG. 6 shows a schematic view of an example computing environment in which the computing device of FIG. 1 may be enacted.

FIG. 6 schematically shows a non-limiting embodiment of a computing system 300 that can enact one or more of the methods and processes described above. Computing system 300 is shown in simplified form. Computing system 300 may embody the computing device 10 described above and illustrated in FIG. 1. Computing system 300 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 300 includes a logic processor 302 volatile memory 304, and a non-volatile storage device 306. Computing system 300 may optionally include a display subsystem 308, input subsystem 310, communication subsystem 312, and/or other components not shown in FIG. 6.

Logic processor 302 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 302 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 306 includes one or more physical devices configured to hold instructions executable by the logic processors to implement the methods and processes described herein. When such methods and processes are implemented, the state of non-volatile storage device 306 may be transformed—e.g., to hold different data.

Non-volatile storage device 306 may include physical devices that are removable and/or built-in. Non-volatile storage device 306 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 306 may include nonvolatile, dynamic, static, read/write, read-only, sequential-access, location-addressable, file-addressable, and/or content-addressable devices. It will be appreciated that non-volatile storage device 306 is configured to hold instructions even when power is cut to the non-volatile storage device 306.

Volatile memory 304 may include physical devices that include random access memory. Volatile memory 304 is typically utilized by logic processor 302 to temporarily store information during processing of software instructions. It will be appreciated that volatile memory 304 typically does not continue to store instructions when power is cut to the volatile memory 304.

Aspects of logic processor 302, volatile memory 304, and non-volatile storage device 306 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 300 typically implemented in software by a processor to perform a particular function using portions of volatile memory, which function involves transformative processing that specially configures the processor to perform the function. Thus, a module, program, or engine may be instantiated via logic processor 302 executing instructions held by non-volatile storage device 306, using portions of volatile memory 304. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 308 may be used to present a visual representation of data held by non-volatile storage device 306. The visual representation may take the form of a graphical user interface (GUI). As the herein described methods and processes change the data held by the non-volatile storage device, and thus transform the state of the non-volatile storage device, the state of display subsystem 308 may likewise be transformed to visually represent changes in the underlying data. Display subsystem 308 may include one or more display devices utilizing virtually any type of technology. Such display devices may be combined with logic processor 302, volatile memory 304, and/or non-volatile storage device 306 in a shared enclosure, or such display devices may be peripheral display devices.

When included, input subsystem 310 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 312 may be configured to communicatively couple various computing devices described herein with each other, and with other devices. Communication subsystem 312 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 300 to send and/or receive messages to and/or from other devices via a network such as the Internet.

The following paragraphs discuss several aspects of the present disclosure. According to one aspect of the present disclosure, a computing device is provided, including a processor having a plurality of pins that are electrically coupled to a connector via respective electrical traces. The computing device may further include a memory device storing a state table that maps the plurality of pins to a respective plurality of connection protocols. The processor may be configured to implement control logic for the plurality of pins at least in part by receiving a selection of a pin of the plurality of pins, receiving an updated connection protocol for the selected pin, and updating the state table such that the selected pin is mapped to the updated connection protocol. Implementing the control logic may further include, via the connector, establishing a connection to an external device using the updated connection protocol implemented at the selected pin.

According to this aspect, the state table may further include a respective plurality of state conditioning parameters for the plurality of pins. Each state conditioning parameter may indicate, for a pin of the plurality of pins, whether an intermediate circuit element located between the pin and the connector along the electrical trace of the pin is activated or deactivated.

According to this aspect, implementing the control logic may further include receiving an updated state conditioning parameter for the selected pin. Implementing the control logic may further include activating or deactivating the intermediate circuit element in response to receiving the updated state conditioning parameter.

According to this aspect, the intermediate circuit element may be a resistor, a transformer, an optical isolator, or an amplifier.

According to this aspect, updating the state table may include changing whether an input rule or an output rule of the connection protocol is implemented at the selected pin.

According to this aspect, the connector may further include a daughterboard via which one or more peripheral devices are communicatively coupled to the processor.

According to this aspect, the one or more peripheral devices may include one or more optically isolated circuits, one or more additional memory devices, one or more user input devices, one or more output devices, or one or more wireless communication devices.

According to this aspect, the daughterboard may include a coprocessor configured to perform a preprocessing operation on an input transmitted from a peripheral device of the one or more peripheral devices to the processor or an output transmitted from the processor to a peripheral device of the one or more peripheral devices.

According to this aspect, the memory device in which the state table is stored may be located on the daughterboard. The processor may be configured to receive the state table from the memory device upon startup.

According to this aspect, the processor may be further configured to update the one or more respective connection protocols of one or more pins of the plurality of pins according to a predefined temporal multiplexing schedule.

According to this aspect, two or more connection protocols of the plurality of connection protocols may be implemented concurrently over the connector.

According to this aspect, the computing device may further include a display and one or more user input devices. The processor may be further configured to transmit, to the display, instructions to display a state table updating interface. The processor may be further configured to receive, via the one or more user input devices, the selection of the pin and the updated connection protocol at the state table updating interface.

According to this aspect, the connector may include a plurality of connector pins. At least one connector pin of the plurality of connector pins may be electrically coupled to two or more multiplexed pins of the plurality of pins of the processor.

According to another aspect of the present disclosure, a method for use with a computing device is provided. The method may include implementing control logic for a plurality of pins of a processor that are electrically coupled to a connector via respective electrical traces. Implementing the control logic may include receiving a selection of a pin of the plurality of pins, receiving an updated connection protocol for the selected pin, and updating a state table that maps the plurality of pins to a respective plurality of connection protocols such that the selected pin is mapped to the updated connection protocol. Implementing the control logic may further include, via the connector, establishing a connection to an external device using the updated connection protocol implemented at the selected pin.

According to this aspect, the state table may further include a respective plurality of state conditioning parameters for the plurality of pins. Each state conditioning parameter may indicate, for a pin of the plurality of pins, whether an intermediate circuit element located between the pin and the connector along the electrical trace of the pin is activated or deactivated.

According to this aspect, implementing the control logic may further include receiving an updated state conditioning parameter of the selected pin. Implementing the control logic may further include activating or deactivating the intermediate circuit element in response to receiving the updated state conditioning parameter.

According to this aspect, updating the state table may include changing whether an input rule or an output rule of the connection protocol is implemented at the selected pin.

According to this aspect, implementing the control logic may include updating the one or more respective connection protocols of one or more pins of the plurality of pins according to a predefined temporal multiplexing schedule.

According to this aspect, the connector may include a plurality of connector pins. At least one connector pin of the plurality of connector pins may be electrically coupled to two or more multiplexed pins of the plurality of pins of the processor.

According to another aspect of the present disclosure, a computing device is provided, including a processor having a plurality of pins that are electrically coupled to a connector via respective electrical traces. The computing device may further include a memory device storing a state table that maps the plurality of pins to a respective plurality of connection protocols. The processor may be configured to implement control logic for the plurality of pins at least in part by, for a pin of the plurality of pins, communicating via the connector with an external device using a first connection protocol indicated for the pin in the state table. Implementing the control logic may further include updating the state table such that the pin is mapped to a second connection protocol. Implementing the control logic may further include communicating via the connector with the external device using the second connection protocol implemented at the pin.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device comprising:
a processor having a plurality of pins that are electrically coupled to a connector via respective electrical traces, wherein the connector further includes a daughterboard via which one or more peripheral devices are communicatively coupled to the processor; and
a memory device located on the daughterboard and storing a state table that maps the plurality of pins to a respective plurality of connection protocols
wherein the processor is configured to implement control logic for the plurality of pins at least in part by:
receiving the state table from the memory device upon startup;
receiving a selection of a pin of the plurality of pins;
receiving an updated connection protocol for the selected pin;
updating the state table such that the selected pin is mapped to the updated connection protocol; and
via the connector, establishing a connection to an external device using the updated connection protocol implemented at the selected pin.

2. The computing device of claim 1, wherein the one or more peripheral devices include one or more optically isolated circuits, one or more additional memory devices, one or more user input devices, one or more output devices, or one or more wireless communication devices.

3. The computing device of claim 1, wherein the daughterboard includes a coprocessor configured to perform a preprocessing operation on an input transmitted from a peripheral device of the one or more peripheral devices to the processor or an output transmitted from the processor to a peripheral device of the one or more peripheral devices.

4. The computing device of claim 1, wherein the processor is further configured to update the one or more respective connection protocols of one or more pins of the plurality of pins according to a predefined temporal multiplexing schedule.

5. The computing device of claim 1, wherein two or more connection protocols of the plurality of connection protocols are implemented concurrently over the connector.

6. The computing device of claim 1, further comprising a display and one or more user input devices, wherein the processor is further configured to:
transmit, to the display, instructions to display a state table updating interface; and
receive, via the one or more user input devices, the selection of the pin and the updated connection protocol at the state table updating interface.

7. The computing device of claim 1, wherein:
the connector includes a plurality of connector pins; and
at least one connector pin of the plurality of connector pins is electrically coupled to two or more multiplexed pins of the plurality of pins of the processor.

8. A method for use with a computing device, the method comprising:
implementing control logic for a plurality of pins of a processor that are electrically coupled to a connector via respective electrical traces,
wherein the connector further includes a daughterboard via which one or more peripheral devices are communicatively coupled to the processor,
wherein implementing the control logic includes:
upon startup, receiving, from a memory device located on the daughterboard, a state table that maps the plurality of pins to a respective plurality of connection protocols;
receiving a selection of a pin of the plurality of pins;
receiving an updated connection protocol for the selected pin;
updating the state table such that the selected pin is mapped to the updated connection protocol; and
via the connector, establishing a connection to an external device using the updated connection protocol implemented at the selected pin.

9. The method of claim 8, wherein implementing the control logic includes updating the one or more respective connection protocols of one or more pins of the plurality of pins according to a predefined temporal multiplexing schedule.

10. The method of claim 8, wherein:
the connector includes a plurality of connector pins; and
at least one connector pin of the plurality of connector pins is electrically coupled to two or more multiplexed pins of the plurality of pins of the processor.

11. A computing device comprising:
a processor having a plurality of pins that are electrically coupled to a connector via respective electrical traces, wherein the connector further includes a daughterboard via which one or more peripheral devices are communicatively coupled to the processor; and a memory device located on the daughterboard and storing a state table that maps the plurality of pins to a respective plurality of connection protocols wherein the processor is configured to implement control logic for the plurality of pins at least in part by:
receiving the state table from the memory device upon startup;
for a pin of the plurality of pins, communicating via the connector with an external device using a first connection protocol indicated for the pin in the state table;
updating the state table such that the pin is mapped to a second connection protocol according to a predefined temporal multiplexing schedule; and
communicating via the connector with the external device using the second connection protocol implemented at the pin.

\* \* \* \* \*